(12) United States Patent
Grove et al.

(10) Patent No.: US 7,020,719 B1
(45) Date of Patent: *Mar. 28, 2006

(54) SYSTEM AND METHOD FOR HIGH-PERFORMANCE DELIVERY OF INTERNET MESSAGES BY SELECTING FIRST AND SECOND SPECIALIZED INTERMEDIATE NODES TO OPTIMIZE A MEASURE OF COMMUNICATIONS PERFORMANCE BETWEEN THE SOURCE AND THE DESTINATION

(75) Inventors: Adam J. Grove, Menlo Park, CA (US); Michael Kharitonov, New York, NY (US); Alexei Tumarkin, Santa Barbara, CA (US)

(73) Assignee: Netli, Inc., Palo Alto, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 10/241,795

(22) Filed: Sep. 10, 2002

Related U.S. Application Data

(63) Continuation-in-part of application No. 09/534,321, filed on Mar. 24, 2000, now Pat. No. 6,820,133.

(60) Provisional application No. 60/318,597, filed on Sep. 10, 2001.

(51) Int. Cl.
*G06F 15/16* (2006.01)
*G06F 15/173* (2006.01)

(52) U.S. Cl. ............. 709/238; 709/227; 709/230; 709/241

(58) Field of Classification Search ........ 709/217, 709/219, 226, 230, 238, 242, 245, 227, 241; 370/328, 401
See application file for complete search history.

(56) References Cited

U.S. PATENT DOCUMENTS

| | | | |
|---|---|---|---|
| 5,754,774 A | 5/1998 | Bittinger et al. | |
| 5,802,518 A | 9/1998 | Karaev et al. | |
| 5,852,717 A | 12/1998 | Bhide et al. | |
| 5,953,340 A | 9/1999 | Scott et al. | |
| 6,002,689 A | 12/1999 | Christie et al. | |
| 6,006,264 A | 12/1999 | Colby et al. | |
| 6,026,433 A | 2/2000 | D'Arlach et al. | |
| 6,058,431 A | 5/2000 | Srisuresh et al. | |
| 6,081,840 A * | 6/2000 | Zhao | 709/230 |
| 6,108,703 A | 8/2000 | Leighton et al. | |
| 6,141,325 A * | 10/2000 | Gerstel | 709/242 |
| 6,170,075 B1 | 1/2001 | Schuster et al. | |
| 6,185,598 B1 | 2/2001 | Farber et al. | |
| 6,304,564 B1 | 10/2001 | Monin et al. | |
| 6,370,114 B1 | 4/2002 | Gullicksen et al. | |
| 6,385,647 B1 * | 5/2002 | Willis et al. | 709/217 |
| 6,401,114 B1 * | 6/2002 | Jenkins | 709/219 |
| 6,415,329 B1 * | 7/2002 | Gelman et al. | 709/245 |
| 6,415,335 B1 * | 7/2002 | Lowery et al. | 709/238 |
| 6,483,808 B1 | 11/2002 | Rochberger et al. | |
| 6,490,615 B1 * | 12/2002 | Dias et al. | 709/226 |
| 6,542,964 B1 | 4/2003 | Scharber | |

FOREIGN PATENT DOCUMENTS

| WO | WO 97/29424 | 8/1997 |
|---|---|---|
| WO | WO-98/10541 A1 | 3/1998 |
| WO | WO 99/06913 | 2/1999 |

OTHER PUBLICATIONS

Khan, K.S., "A Hybrid System for Global Communications," 10th Int'l Conference on Digital Satellite Communications, 1995, vol. 2, pp. 559-565.

Mourad, Antoine et al., "Scalable Web Server Architectures," Proceeding of IEEE Symposium on Computers & Comm., Jul. 1, 1997.

* cited by examiner

*Primary Examiner*—Rupal Dharia
*Assistant Examiner*—Quang N. Nguyen
(74) *Attorney, Agent, or Firm*—White & Case LLP

(57) ABSTRACT

The invention uses a distributed network of specialized nodes of different types dispersed around the Internet. In operation, web client's requests are directed to a node of a first type chosen to be close to the client, and the client communicates with this node using a standard protocol such as HTTP. This first node receives the request, and locates a node of a second type, chosen to be an optimal initial relay on a path to the web server. The first node may communicates the request to the second node using a different, specialized, protocol that has been designed for improved performance and specifically to reduce traffic volume and to reduce latency. The second node receives communication from the first node using this specialized protocol, and relays it to an optimally chosen third node using the same, or possibly different internode communication protocol. This process may repeat over additional internode hops until finally, the last node receives the request from the previous network node, converts it back to a standard protocol such as HTTP, and forwards the request to the server. Responses from server to client can take the same or similar reverse route, and can also be carried over specialized protocols between the network nodes. In addition, these nodes can employ other techniques such as web caches that avoid or improve some communication steps.

24 Claims, 1 Drawing Sheet

Figure 1:
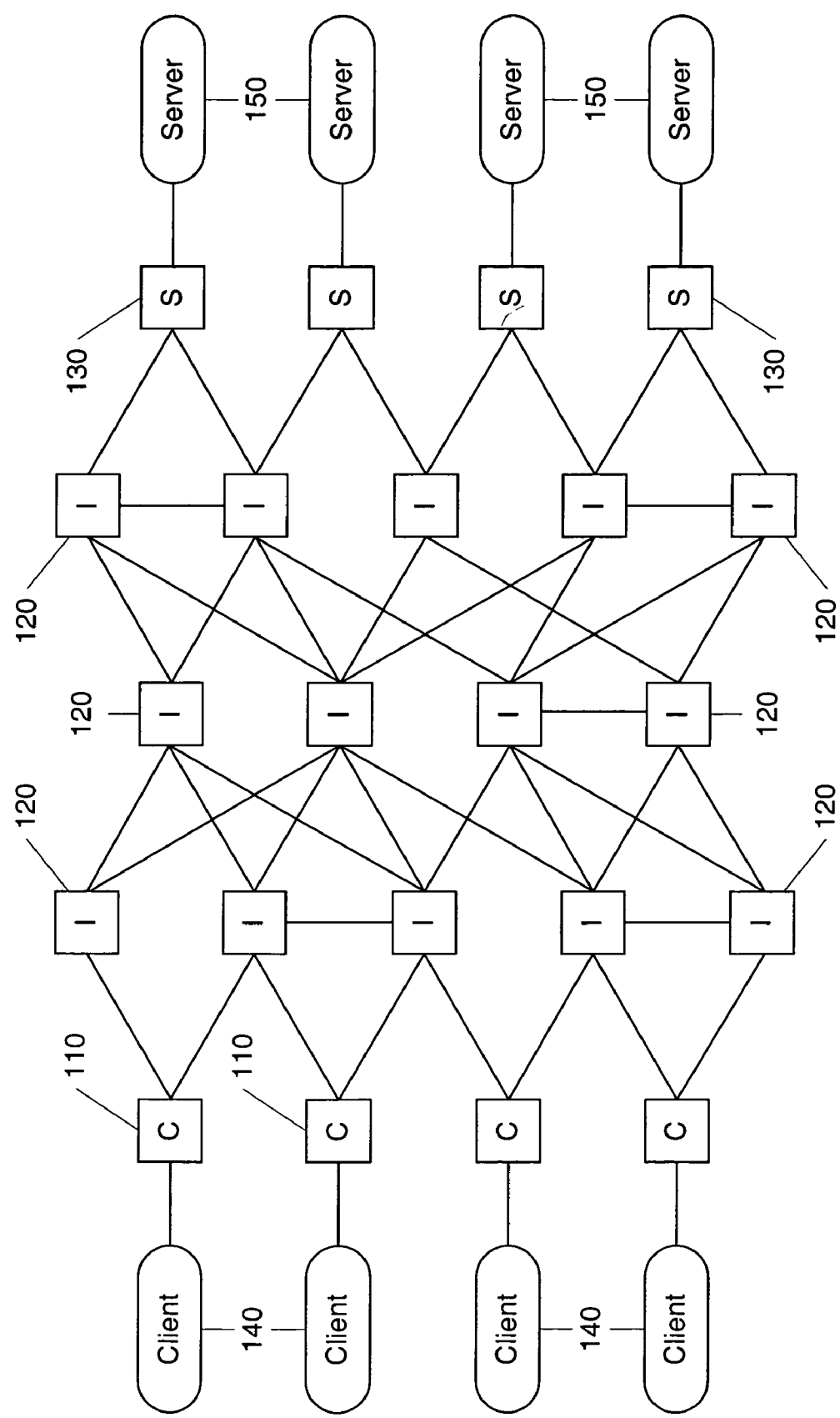

SYSTEM AND METHOD FOR HIGH-PERFORMANCE DELIVERY OF INTERNET MESSAGES BY SELECTING FIRST AND SECOND SPECIALIZED INTERMEDIATE NODES TO OPTIMIZE A MEASURE OF COMMUNICATIONS PERFORMANCE BETWEEN THE SOURCE AND THE DESTINATION

This application is a continuation-in-part of application Ser. No. 09/534,321, filed Mar. 24, 2000 now U.S. Pat. No. 6,820,133. This application also claims priority to the provisional patent application entitled "Overlay Network for Improving Performance of Web Content Delivery", Ser. No. 60/318,597, filed Sep. 10, 2001.

FIELD OF INVENTION

The invention relates to communication between web clients, such as browsers, and web servers, where the communication is carried at least in part over the Internet or any other network layer in which bandwidth usage and communication latency are of concern.

BACKGROUND

Today, improving the performance of Internet communication is of major technological and commercial concern. Investment in improving the Internet network infrastructure is estimated to become a $1.3 trillion dollar industry by 2003 (Source: Nortel Industries press release Jan. 31, 2000). It has been estimated that many web users will not tolerate a delay in downloading a web page of more than about 8 seconds, and that the current value of e-commerce sales at risk because of slow download speeds is $4.35 billion per year. (Source: Zona Research report "The need for speed", abstract available http://www.zonaresearch.com/info/press/99-jun30.htm). In this climate there is pressing demand for ways to improve web performance, and no simple or obvious techniques are overlooked.

The invention presented here is a technique that offers significant Internet performance gains, can be deployed at relatively modest cost in less than a year, and needs neither major infrastructure changes nor changes to end-user software.

Content Distribution and Caching

A Content Distribution (CD) network is a collection of specialized nodes or devices, placed in a larger network such as the Internet at chosen locations such as in the offices of Internet Service Providers (ISPs). These nodes store certain web content on behalf of the content redistributors' customers. Such stores are sometimes caches, mirrors, or repeaters. We use former term throughout the following.

The second technological aspect to a Content Distribution service is a redirection or interception service. When a web user (using a client such as a browser) asks to be sent content from a site, and the content is known or suspected to be cached at one or more CD nodes, the request is directed (or comes to be redirected) to some such CD node that is "close" to the user. The notion of closeness used varies, and in particular can use such metrics as bandwidth capacity, bandwidth cost, latency, security, administrative boundaries, administrative convenience, and current congestion on various network paths. The technologies for choosing a close CD node and then directing requests to the chosen node are varied, but the field is still new and there is still considerable ongoing innovation. Redirection comprises both the processes of determining a close node that has (or is likely to have) the cached content, and of ensuring that the request is actually directed to the chosen node.

An alternative to redirection is interception, in which a node is placed in the network path from the client in such a way that it gets to see all web traffic from the client. A web proxy or other specialized device such as a router, for instance located at the client's ISP, can be used for this purpose. In this case, the node intercepts all traffic and if it sees a request for content it has cached (or can readily fetch from a nearby cache) then it can return the content immediately, but otherwise it relays the traffic to its destination unchanged.

The advantages of Content Distribution are the possibility of serving traffic to the user from a close CD node, thus getting the response to him faster, cheaper, with less bandwidth, and perhaps more reliably. It is common to see reports of up to 10× improvement in the speed at which content is served to the end user.

The major disadvantage of Content Distribution is that it is inappropriate for dynamically generated content or rapidly changing content. A CD node typically stores images, videos, and static text pages that do not change much from user to user. Such content is kept on the CD server in anticipation of requests for it (or perhaps, if there has already been one request, in anticipation of further requests from another user). However, much content on the Internet is generated on-the-fly in response to a customer's request; for instance, generated by a server program using the Common Gateway Interface (i.e. a "cgi-bin" program). Since the output of such a program may never be the same twice, or at least be likely to differ from person to person, it is generally not feasible to prepare in advance. (There are, after all, hundreds of millions of web users; one could not generate and store this many customized pages in advance.) As web content becomes more personal and more customized to each user the importance of such pages will increase further. CD networks cannot anticipate such pages and so generally cannot improve the speed at which they are served.

A second disadvantage arises since even content usually described as being "static", such as images and fixed text, may be subject to occasional change. It is important to ensure that the caching node or Content Distribution node not serve "stale" content (i.e. content that is no longer in agreement with the definitive copy on the origin server.) A variety of schemes are used to ensure that content is fresh, or to lower the probability of delivering stale content. The mature field of caching technology addresses such issues. However, by the nature of the problem then there is no perfect solution to this problem. To illustrate the issues, consider that the most recent version of the web protocol, HyperText Transfer Protocol Version 1.1, includes support for caching and Content Distribution that works as follows. A node with a cache can send a short message to the origin server asking, in effect, whether the copy of a web object held by the cache is still up to date. If so, a short acknowledgement is return to the cache. If the cache node or CD node always makes such an inquiry before delivering content to a client then there is no chance of delivering stale content. But there is a delay, possibly large, as the message is sent to the origin server and the response is received. This scheme may reduce the volume of traffic sent over the network (bandwidth consumption) but does not necessarily reduce the delay before the content is seen by the client (latency). Such tradeoffs are inherent to any caching or Content Distribution technology.

A third disadvantage of caching and Content Distribution technology is that it requires significant computer resources, since a cache keeps copies of web content just in case a client will request them. A cache may keep many objects that do not, in fact, get requested by a client before they become stale, and these consume expensive resources such as memory or disk space. The problem is made worse since a typical Content Distribution network has numerous caching nodes. There are many techniques that reduce this problem, e.g. by carefully distribution of cached content across a network of multiple caching nodes. However, the expense of resources is inherent to the technology and can only be reduced, but not eliminated, by such techniques.

The term "caching" (or "proxy caching") is sometimes used to refer to a technique related to Content Distribution. There are only slight technical differences. "Caching" is more often heard when interception technology is used rather than redirection technology. Second, nodes are more likely to be called caches if they are operated on behalf of the clients rather than on behalf of the content originators. In European Patent Application WO9940514 the latter distinction, which is more a commercial distinction rather than a technical one, is regarded as definitive. A related technology is server-side caching (also known as "reverse proxying") in which a cache node is located near the server rather than near clients. This technology delivers smaller performance gains than conventional caching or Content Distribution, but comes at a reduced resource cost because only one such node is needed.

All forms of caching share the first two of the disadvantages of Content Distribution described above, most critically being the inability to handle dynamically generated content.

HTTP and TCP

HyperText Transport Protocol (HTTP) is the application-level network protocol used when a client requests web content from a web server, and used by the web server when it responds to such requests. Modern network communication is layered, which means that higher-level protocols build on top of lower-level protocols (which in turn may build on other protocols). HTTP is a high-level protocol, which includes commands to request content, respond with content, negotiate the form in which content is sent, and so forth. It is generally carried over a lower-level protocol Transmission Control Protocol or TCP. TCP enables reliable end-to-end connectivity between two locations in the Internet, but does not interpret the content sent between these two locations in any way: it just carries a stream of bytes. TCP in turn is generally carried over Internet Protocol (IP), which is a packet-oriented protocol that does not guarantee reliable delivery.

TCP was developed and deployed well before HTTP we developed, and was designed for bulk bi-directional data transfer. HTTP is characterized by short request messages and moderate-length response transactions, and very bursty traffic. That TCP is not an optimal protocol for carrying HTTP is well known and extensively documented.

The paper "Modeling the Performance of HTTP Over Several Transport Protocols" in IEEE/ACM Transactions on Networking, vol. 5, number 5, October 1997, by Heidemann, Obraczka, and Touch, is representative of research addressing these issues. They claim, for instance, These mismatches between the needs of HTTP and the services provided by TCP contribute to increased latency for most web users. Fundamentally, TCP is optimized for large-scale bulk data transport, while HTTP often needs a lightweight, request-response protocol.

The mismatches referred to here relate to a number of technical features of TCP, including those known as "three way handshake", "slow-start congestion avoidance", and "TIME_WAIT tear-down delays". The Heidemann, Obraczka and Touch paper discusses several such improved protocols, such as Transaction TCP (T/TCP) and Asynchronous Reliable Delivery Protocol (ARDP). Other defects in TCP as it relates to HTTP include the flow-control algorithm being used, which can lead to unnecessary traffic and delays in the event of noise or error on the network.

HTTP itself is an evolving, improving protocol, but has recognized performance deficiencies even aside from the interrelationship with TCP. The PhD Dissertation "Addressing the Challenges of Web Data Transport" by V. N. Padmanabhan (Computer Science Division, University of California at Berkeley, USA; Also published as Technical Report UCB/CSD-98-1016 September 1998) discusses some of these. As an example, it explains how HTTP Version 1.0 (still in wide use today) requires a client to send one request at a time over a given connection, waiting for the response to arrive completely before continuing, and at considerable performance cost (as the dissertation proves).

To appreciate the invention, it is important to see that even when problems are noticed and improved protocols developed, it may take a long time before such improvements become widely deployed. The delays are particularly long before they reach the public Internet infrastructure. Of course, costs are always large when significant software upgrades are involved. But in the case of protocol upgrades, delays are even longer because no one person can upgrade unilaterally: both ends of a network conversation must be using the same version of the same protocol. In the case of the Internet, a protocol change involves some sort of community-wide coordinated update. For example, the problem with HTTP Version 1.0 cited above from Padmanabhan's dissertation was corrected in the next version of the protocol, where a feature known as "pipelining" was defined, but even several years after this was first suggested there are very few web browsers that adopt it. Similarly, all proposals to replace TCP have languished, and today all major web browsers and web servers support HTTP over TCP only.

OVERVIEW

In a preferred embodiment, the present invention comprises specialized nodes that are deployed near web servers and clients, and at chosen locations within the internet (e.g., on different intermediate "backbone" networks). A redirection system is preferably used to select one such node near a given client and direct certain traffic from the client to the selected node. The selected node near the client selects a second node in the internet using the information communicated to it by the redirection system, and uses a high performance protocol to communicate with the second node. The second node communicates with the third node, etc. The last node uses a conventional web protocol to communicate with the target server.

In one preferred embodiment, the invention comprises a distributed network of specialized nodes, located at various points in the Internet. Unlike conventional Content Distribution systems, the invention calls for at least three types of nodes, which we here call C-nodes, S-nodes, and I-nodes. The invention operates when a web client (for instance, a person using a browser) issues a request intended for some web-site that the invention has configured to manage, or alternatively issues a request for a particular web object that the invention is configured to manage. Throughout the following, the client is the user or device requesting the content, and the server is the origin server containing a definitive copy of the content and that would normally be responsible for delivering the content to the client.

The invention preferably employs a means to identify some C-node that is close to the client, in terms of any standard network cost or distance metrics, and means of ensuring that the request is directed to the chosen C-node. Alternatively, the invention may use means to ensure that all traffic from the client passes through some close C-node and is subject to possible relaying by that node. Existing means as used in the Content Distribution industry can be employed.

The chosen C-node then receives the request. All communication between the client and the C-node will use network protocols of the client's choosing, and hence will typically be a standard widely-deployed protocol. Today, for web traffic this will typically be HTTP Version 1.0, HTTP Version 1.1, or some intermediate protocol that uses some but not all features of HTTP 1.1, and any such version of HTTP will be carried over TCP.

If the C-node has the requested object in its cache or database, it may return it directly to the client and thus function as a conventional web cache or content distributor. In addition to conventional caching functionality, the C-node can maintain a database that keeps track, for every web site and web object it is configured to manage, of the identity of an I-node that is determined to be optimal for handling the communication to the corresponding server for that site or web object. Today, the identity is likely to be in the form of an IP (Internet Protocol) address or an Internet Domain Name for the I-node. The C-node communicates the request to the chosen I-node, using a specialized protocol designed to be of higher performance than the prevailing standard protocol used by the client. Since C-nodes and I-nodes are closely coupled, innovative protocols can be used without requiring the rest of the world (or Internet) to adopt them. In addition, since C-nodes and I-nodes have a specialized purpose, they can use protocols that (for reasons of complexity, say, or large memory requirements) could never be deployed widely in web clients or servers. It is important to realize that many such optimized protocols are known, although many have not moved beyond the research laboratory. This aspect of the invention is not specific to any particular C-node to I-node protocols, and anticipates further developments in this area. One can speculate that no matter how the state-of-the-art in widely deployed, standardized, protocols evolves there are always likely to be better protocol innovations in the research pipeline that the invention could be using. In Section 4 we describe some known candidates for the optimized protocols, and another aspect of the invention, comprising enhancements to the described protocols.

Many enhanced protocols between C-node and I-node can be carried over the public Internet Infrastructure, as is true for all the examples given in Section 4 However, traffic between C-nodes and I-nodes can also be carried on a private network, for instance one designed for higher-performance communication than the public network.

The chosen I-node receives the request from the C-node, using the specialized high-performance protocol. The I-node may find the requested content in its own cache, or else may need to contact a second I-node to obtain it. In the latter case, the first I-node may communicate with the second I-node in another specialized protocol designed to optimize the performance of the link between these two I-nodes. This procedure is repeated until the last I-node relays the request to the S-node close to the server. The chosen S-node receives the request from the last I-node, using the specialized high-performance protocol. The S-node may find the requested content in its own cache, or else may need to contact the server to obtain it. In the latter case, the S-node may communicate with the server in protocol of the server's choice, which today will typically be a version of HTTP over TCP. In this latter case, the S-node retrieves the response from the server. In either case, the S-node can forward the response back to the originating C-node using the reverse path involving the same I-nodes. The C-node will then communicate the received response back to the web client using its chosen standard protocol.

In this preferred embodiment, each node prior to the S-node employs a table or other means to select a suitable "next-hop" node (which is an I-node or the final S-node) on the path to the server. This selection mechanism may use network mapping and monitoring means, of which some examples are discussed later. The selection may be made with a view to optimizing the communication performance, as measured for instance by user perceived latency and download time, over the entire path. The selection may also choose to consider other factors, such as the financial cost of using particular node-to-node sublinks, or the relative load currently being placed on each considered node.

In another embodiment, the choice of the entire sequence of nodes to be used, or a subsequence thereof, may be made by a separate system that is potentially distinct from the C-nodes, I-nodes, or S-nodes, or which can be integrated with any such node. In this case, means are employed so that the chosen path (or chosen subset of the entire path) is communicated to all nodes appearing in the chosen path, so that each such node will know the "next hop" node in the path.

In one aspect, an object of the invention is to divide the end-to-end communication into several distinct sublinks each way—i.e., client to C-node, C-node to I-node, I-node to another I-node, I-node to S-node, S-node to server (and correspondingly reverse steps for the response)—such that the first and last steps use standard and possibly inefficient protocols are short (using conventional network distance metrics), and to the extent possible the intermediate step covers the bulk of the network distance but can use optimally efficient protocols and routes by virtue of different choices of intermediate I-nodes. Note that there may be zero or more intermediate I-node to I-node hops. Note also that the three types of nodes may employ similar functionality, with the C-node and S-nodes being primarily differentiated by their positioning at the either end of the communication chain and also by their ability to communicate with, respectively, the client and the server using standard protocols.

An important advantage of the invention is that it can accelerate delivery of dynamically generated and non-static content, whereas caching and content distribution cannot.

Content Distribution methods emphasize proximity between cache nodes and clients (where cache nodes are in this sense analogous to C-nodes), so that communication between client and cache node is fast. But an important converse to this is that, by minimizing client to cache node distance, one maximizes the cache node to server distance and so maximizes the gain to be had in deploying better protocols over this distance. The present invention advantageously accomplishes this by deploying S-nodes close to web servers and C-nodes close to clients.

Significant benefits are realized by dividing the client-to-server end-to-end transaction into three or more parts as is achieved by the invention and described above. The C-node may be a relatively short network distance from the client and uses a widely-deployed conventional protocol (preferably HTTP over TCP) to communicate with the client. The S-node may be a relatively short network distance from the server and can use a widely-deployed conventional protocol (preferably HTTP over TCP) to communicate with the server. The C-node and the S-node may be separated by a relatively larger network distance, and use high performance protocols (preferably one or more of those described in section 4) between themselves directly or between themselves and strategically located I-nodes. Similarly, one I-node may communicate with another using such high-performance protocols. Irrespective of whether standard protocols or such high-performance protocols are used for node-to-node communication, in one aspect an option of the invention is to use the choice of nodes and the sequence in which they are used to exercise control over the path by which communication is carried from client to server (or from server to client). An advantage to be had by exercising such control is that the path may be chosen to avoid regions of the internet experiencing congestion, technical malfunctions, or that have other performance-damaging characteristics. Another advantage to be gained by path selection is better control over the costs incurred in the communication, because traffic can be steered away from expensive network providers. A third advantage is that security can be enhanced, because traffic can be steered away from untrustworthy network providers or untrusted sections of the Internet.

It is another important advantage of the invention that it can be deployed without any changes in the client or server machines or to their software, and thus can reduce the cost and time before advanced protocols are deployed.

DETAILED DESCRIPTION OF THE INVENTION

As shown in the drawing, the invention comprises a distributed collection 100 of specialized computers or network nodes, of three types hereafter called C-nodes 110, I-nodes 120 and S-nodes 130 (although it is possible that the functionality of any two or even all three node types may be present in a single physical device). As discussed below, certain embodiments of the invention include other components in addition to C-nodes, I-nodes and S-nodes such as clients 140 and servers 150. These nodes may also be embodied as computer software executing on a general-purpose computer that also serves other purposes, or may be embodied as a tightly-coupled cluster of computers. C-nodes are distributed throughout the network with the intent that most Internet users will be close, in network terms, to at least one C-node. In particular, C-nodes may be placed on Internet Service Providers' (ISP) premises, on large corporate networks, on Internet backbone networks, and elsewhere. Correct operation of the invention does not depend on how well the C-nodes are located, although the benefits that are delivered by the invention may depend on this.

I-nodes are distributed within the interior of the network with the intent of establishing different controlled paths between C-nodes and S-nodes. These paths, determined by the choice of different I-nodes, can be constantly monitored using specialized software running on I-nodes. In particular, I-nodes may be placed to isolate slower links, or links that are more prone to packet loss. Correct operation of the invention does not depend on particular locations of the I-node, although the extent of the benefits that are delivered by the invention may vary depending on the locations chosen. In a preferred embodiment, the invention includes or uses means such that certain web traffic, including requests for web content, is communicated to a C-node instead of being communicated directly to the server that would ordinarily deliver such content. These means should have the property that the chosen C-node for any request be close to the originator of the request (hereafter, the "client"). The notion of closeness used can include any combination of such metrics as bandwidth capacity, bandwidth cost, latency, security, administrative boundaries, administrative convenience, current congestion on various network paths, and geographic proximity, although other factors may also be taken into account. However correct operation of the invention does not depend on which notion of closeness is used, or how close the chosen C-node actually is.

Regardless of which means are chosen, we call the component of the system that arranges for traffic to be sent to a close C-node, or automatically pass through such a C-node, the redirection system. In the following, we list six means, numbered R1 through R6, that can be used within the redirection component of our invention. However, this list is not complete and the invention contemplates other means that can be used instead. Finally, as anyone skilled in the art will appreciate, many combinations or variants of methods in the following list can serve as redirection means.

[R1] Web proxy serving. Most web clients can be configured to use a proxy. When so configured, the client sends requests to the designated proxy, rather than directly to the source of the requested content (e.g. to the web server containing the content). The proxy then obtains the information on the client's behalf, and then forwards this response back to the client. Client configuration can be done manually (i.e., the user sets parameters in his browser), automatically (e.g., the browser downloads configuration settings including proxy settings from a known location), or may be fixed into the client code. A client may go to the same proxy for every request, or may make the decision as to whether to use a proxy (and if so, which proxy) on a request-by-request basis.

In the context of the invention, human judgment or a computer program can be used to determine the address or name of a close C-node based on the location or relative distance of the client. Then, using either manual or automatic configuration, the client is configured to use the C-node as its proxy for appropriate web traffic.

The disadvantage of this scheme is that the client software needs explicit configuration.

[R2] Transparent network processing. A specialized computer or network element such as a router may be located in the network in such a way that all traffic from certain clients passes through this node. This node can run hardware or software that inspects all outgoing traffic, and can make a decision for each packet or traffic stream as to whether such traffic passes unhindered on its normal route, or else whether the packet is due for special processing.

The node is configured to process web requests and other traffic that should be handled by the invention. In order to be able to see all traffic from the client, the pass-through node will generally have to be close to the client (for instance, on the same machine as the client, the same physical network as the client, or at the client's ISP). Thus, a node configured to inspect such traffic can serve as a C-node.

A variant of this processing system occurs when the pass-through node is not itself a C-node, but has the ability to send selected traffic to a nearby C-node, e.g. using IP routing and/or encapsulating the IP packets then forwarding them to the C-node. In this case, various means can be used for the pass-through node to know the identity of the nearby C-node. For instance, the name or IP address of the nearest C-node may be fixed into the pass-through node, or stored in a database accessible to the pass-through node. Alternatively, the pass-through node may query a specialized computer or system that analyzes network distances and can identify a suitable C-node.

A disadvantage of redirection method R2 is that there may be restrictions on where a pass-through node can be placed in order for it to be able to inspect all traffic.

[R3] DNS redirection. When a client issues a web request, it generally identifies the server for the request by its domain name, such as "www.someserver.com". Specialized network elements exist that map such names into network addresses, which in the Internet are generally numeric Internet Protocol (IP) addresses. The Internet routing infrastructure locates computers and network elements based on IP address. The most common service in use today for mapping names to network addresses is called the Domain Name System, or DNS. However, there may arise various competing directory services with a similar purpose, and our subsequent discussion could be applied to such services as well.

Usually DNS is configured to return the actual address of the web server. However, it may be configured to return the address of another computer or network node. In such cases, traffic intended for the server will in fact arrive at the other node instead. This may however be acceptable so long as the other node can function correctly in place of the intended server, or is able to forward the traffic onwards to the intended server.

In the context of our invention, redirection can be achieved by having DNS map the name of the server to the address of a closely located C-node rather than to the address of the server itself. In this context, it is important to note that the DNS system does not need to return the same address to every query that it receives for a particular name. Since the DNS can determine the IP address of the requester (which may itself be another DNS server), it can be configured to return an address that can differ depending on the requesting client, and in particular can identify a node close to that client. There are several specific ways of configuring the DNS system or writing DNS software in order to return the IP address of a C-node that is likely to be close to the requesting client. These are well known to those skilled in the art.

A disadvantage of this method is the need to manipulate DNS entries and possibly to deploy special DNS software.

[R4] DNS redirection using dedicated domain names. A variant of method R3 involves using a new domain name, such as "www.cnode.com", that is distinct from the server's domain name. The DNS system is configured to return a different IP address for this new name depending on the requesting client, such IP address identifying a C-node close to the client. In this variant of R4, the actual server keeps its original name, for instance "www.someserver.com", and DNS maps this name to server's correct IP address (and not, unlike R3, to a C-node's address).

When the server delivers content, the content may contain references to yet other web objects. In particular, pages in HyperText Markup Language (HTML) can contain references to other objects held on the server or elsewhere. In this variant of R4, the server can refer to an object using its own name (e.g. "www.someserver.com") if it does not want the object to be handled by the invention, and can refer using the new name (e.g. "www.cnode.com") in order to have such content handled by the invention.

One advantage of this method is that the web server's DNS lookup returns the server's true address. One disadvantage is that the server must change its content by modifying the Uniform Resource Locators (URLs) of content it refers to if it is to use the invention.

[R5] HTTP redirection. Versions of the HTTP protocol include various "redirection" commands and responses. When a client requests content from a site, it may receive a response that does not include the requested content, but instead names an alternative location where the content can be found. We call these HTTP redirection responses. Most web clients are configured to automatically go to the suggested location without needing additional user feedback.

To use HTTP redirection as part of the invention's redirection mechanism, a request will initially be sent to a fixed destination, which may be the server itself or else some other specialized node, but which has not necessarily been chosen to be close to the client. This node can use the address of the requesting client to determine the identity of a C-node that is near to that client, and then HTTP to redirect the client to use that C-node. This determination can be done by the server itself, running software for this purpose, or the server can query another specialized computer. A variant of this method is that request is initially sent to the server, which HTTP redirects the request to another specialized computer that is capable of locating a C-node close to the server, and then this specialized computer performs a second HTTP redirection to the chosen C-node.

An advantage of this system is that it does not depend on DNS manipulation. A disadvantage is that there is some communication overhead as each request is HTTP redirected. In cases where the cost of requesting is small, and the bulk of communication cost is in returning the response, this overhead may be insignificant.

[R6] HTTP redirection and URL rewriting. This is a variant of R5. When a request has been redirected to some C-node, the C-node will be responsible for returning the response to the client. If the response is HTML, and contains references to other objects (URLs), these references may contain the domain name of the original server. The C-node may modify the HTML to replace the name of the server with the C-node's own name or IP address. In this fashion, if the client later decides to request one of the referenced objects, the request will automatically be sent directly to the C-node rather than having to incur the overhead of redirection.

An advantage of this method is that redirection overhead is frequently voided. A disadvantage is the computational overhead of modifying the URLs throughout the original web page.

Redirection methods R1–R6 are possible means by which Internet traffic intended for the server is in fact first sent to a C-node. Sometimes it is possible to determine the appropriate C-node by human judgment or one-time network analysis and then fix the mapping from client to C-node: e.g. to manually configure each client's proxy setting as in method R1.

At other times, the determination of C-node proximity must be revisited frequently, because of congestion in the network that changes the network latency between two Internet locations, time-dependent bandwidth costs, which C-nodes are currently operational, and other features. To achieve this, one can deploy one or more specialized computers or software systems that monitor web traffic on an ongoing basis, and such machines can build a "map" or model showing current network distances which can be used to choose an appropriate C-node for each client. Many mapping and monitoring systems are known to those skilled in the art. The following list is not intended to complete, but merely to show some examples of these techniques. A preferred embodiment uses all the methods below in combination.

[M1 Measurements taken from representative machines to C-nodes.] A software program running on any machine in the network can measure the latency between itself and a second computer, for instance a C-node, by sending a short IP packet of a special form and measuring how long it takes for a response to return to the first computer (sometimes called "pinging"), and can likewise measure bandwidth by measuring how long it takes to send a longer data stream of known length and dividing by transmission time. Such software program can be also implemented as a standard web browser requesting particular web objects or a web browser emulator. (In addition other measurement schemes are well known.) Thus, one may deploy such software at many locations in the Internet each thought to be representative of a certain class of users; for instance such software located at an ISP's point-of-presence facility may be assumed to be representative of the ISP's users in that area. Each installation of this software will periodically measure the bandwidth and latency to each C-node (or some chosen collection of candidate C-nodes), and will periodically communicate its findings to a centralized "mapping" device which collates and analyzes the findings.

[M2 Measurements taken from C-nodes to representative machines.] C-nodes may also contain software as in M1 and measure the current network distance (in terms of latency, bandwidth, or other measures) between themselves and a specified collection of other computers or network devices (such as routers). In particular, such information can be routinely collected and stored as a result of the communications between clients and C-nodes in a manner similar to the standard procedures implemented for obtaining detailed web server logs. This information is communicated to a mapping device as in M1.

[M3 Load and availability of C-nodes.] A mapping device may periodically query each C-node to find out if the C-node is still operational, and if so then to obtain a report from the C-node as to its current capacity and load.

[M4 Source-routed network measurements.] A mapping device or other computer can estimate bandwidth and latency between itself and a specified C-node by sending special packets as described in M1, but can furthermore can use "IP level source routing" to specify that these packets may go through a specified intermediary machine on their way to the C-node. This intermediary machine may be a client computer or a network node thought to be representative of a class of clients. The mapping device may make such estimates for more than one C-node. Since the distance between the mapping device and the chosen intermediary may be regarded as a constant independent of which C-node is being queried, the differences between these measures for different C-nodes can be used as an approximate measure for the distance between the intermediaries and the clients.

[M5 Routing information.] Internet routers employ standard algorithms so that IP traffic can be sent from a source computer to a destination computer using an efficient path. As part of these algorithms, these routers maintain information about the topology of the Internet including heuristic measures of the distance between the router and certain other locations on the Internet. This information can be extracted and forwarded to a mapping device.

[M6 Map analysis.] A mapping device that collects information as to the network distance between various pairs of computers can employ known algorithms to analyze this information, and heuristically estimate network proximity even between computers for which it does not have direct measurements. For example, "Spanning tree" algorithms, as discussed in "The Performance of a Service for Network-Aware Applications", by Katia Obraczka and Grig Gheorghiu, Proceedings of the ACM Sigmetrics SPDT'98, may be used.

Using means such as the above, a mapping device can maintain a current model of internet proximity between certain computers, networks, or network devices such as routers, and network nodes (C-, I-, and S-nodes). When a request from a client is received, the mapping device may use this model to choose a C-node close to the client, or to choose a C-node, a sequence of I-nodes, and an S-node that optimize the performance of the client-server communication. The mapping device may be told the name or IP address of the client, and if this name or IP address is among those known to the device it can examine the list of C-nodes to choose the closest one. If the client is not directly known to the mapping device, the mapping device may instead select a known computer thought to be close to the client, and then choose an available C-node close to the known computer. There are several ways to do this, and we give two as examples, First, any Internet computer's IP address is divided into a "network" component and a "host" component, and the mapping computer may choose a known computer with the same network component as the client (since two such computers are usually very close in network terms). Second, if the mapping computer is provided with the domain name of the client, it may choose a known computer that shares the same top-level-domain. For instance, a client "site1.co.nz" is likely to be in New Zealand, so it may make sense to use a known computer "site2.co.nz" if such is available.

In some settings, the mapping computer may not be able to retrieve the IP address or the domain name of the client, but instead is provided with the IP address or domain name of another computer that is likely to be close to the client. A common case is where the client's local DNS server's address is readily available, but not the address of the client itself. In this case, technique such as in the previous paragraph can still be used using the second computer's name or address to stand in for the client.

A second technique that may be used, instead of explicit network mapping, uses IP routers to do implicit mapping. IP routers include algorithms and techniques that attempt to find the shortest path between the source of a communication and the destination. Routing techniques are generally designed under the assumption that each IP address corresponds to a unique machine. But it is possible to give the same IP address to many machines and, if very carefully managed, the existing routing algorithms will tend to send traffic to the closest machine with a particular address. This idea can be used in the invention, if C-nodes are given the same IP address. When used in conjunction with any of R3, R4, R5, R6 this means that it is sufficient to redirect traffic away from the server and towards the invention's C-nodes, but that the redirection can be towards a common IP address and does not need to explicitly choose which C-node is closest to the client. Existing routing infrastructure can automatically direct the traffic to a close C-node.

The following discussion returns to description of other aspects of the invention, and assumes that redirection means have been employed so that the client's web request has been communicated to some C-node.

The invention includes specialized software and/or hardware that resides in the C-nodes. When the C-node receives a web request from a client, the node's software reprocesses the request. The C-node includes software necessary to understand standardized web communication protocols, which today are generally versions of HTTP over TCP although the invention contemplates other protocols becoming widely deployed in the future. In this manner, the C-node can interpret the request received from the client, and can also send acknowledgement messages to the client using the correct protocol so that the client knows that the request has been received.

The remaining software on the C-node is designed with the purpose of obtaining the requested content, if it is not already present at the C-node, and then communicating the response back to the client using any standardized protocol that the client can handle. This will usually be the same protocol that was used by the client to communicate the original request.

A C-node can include an optional cache, which is a store of web content such as web pages and image files. If a web request can be satisfied using content in this cache the C-node may use the cached content in forming its response to the client. There are many strategies for maintaining such a cache, and any can be adopted. The following discussion assumes that the C-node was unable to satisfy the complete request out of its cache.

The C-node includes means for determining the identity of the web server or web site that contains the content necessary to satisfy the client's request, for instance based in the IP address used by the client to make its request, or else from information contained within the request itself.

Having used such means to determine the ultimate source of the requested content (that is, the server) the C-node locates an S-node known to be close to the server, and in one embodiment chooses optimal sequence of intermediate I-nodes for communicating with the S-node.

The choice of I-node(s) may be made using means that monitor the state of network sublinks between pairs of C-nodes and I-nodes, between pairs of two I-nodes, and between I-nodes and S-nodes. These measurements may use known network monitoring techniques, including applications of the principles described in methods M1–M6 above. Further, each node can deploy specialized software for this monitoring process. For example, each node can periodically send probe packets to every other node used by the invention (or a subset thereof). The receiving node can compute how long it took for such packet to travel from the sender to the recipient, for instance by comparing the current time with a synchronized timestamp in probe the packet.

The invention's S-nodes are also located at chosen locations in the Internet. In particular, such locations may include being on the same premises or subnetwork as web servers, being at a commercial "co-location" facility for web servers, being at an ISP, being located on Internet backbone networks, or at backbone peering points. It is also possible that a program executing the functions of an S-node may be running on the same physical hardware as a web server itself, or even integrated with the web server software.

The C-node must deploy means to locate an S-node that is close to a specified web server, and a corresponding sequence of intermediate I-nodes. Examples of such means include the following. First the C-node may store, for instance in a database, a mapping from server name to the name or address of a suitable S-node. Alternatively, the C-node may include software or systems for monitoring network conditions for all plausible paths involving appropriate I-nodes, and thus building Internet proximity "maps" of the type discussed above for C-nodes, possibly using such methods as M1 to M6 and related techniques. In this case, if the C-node has a list of all candidate S-nodes and corresponding sequences of I-nodes, and knows the address of the server itself, it will be able to select an optimal path, i.e. one particular sequence of one or several I-nodes and a single S-node. Combinations of these means, in which the database is used but is periodically updated with the results of network monitoring and mapping, may be used. It is also possible that separate machines or systems are responsible for maintaining the mapping from server names to S-nodes and I-nodes names or addresses, and that the C-nodes query one of these machines or systems. This querying may be done using DNS analogous to method R3 above or by some other protocol. Yet another possibility is that each S-node maintains an up-to-date list of the servers that are close to it, and optimal paths from each C-node to the S-node itself, and the S-node periodically causes this list to be communicated to each C-node so that the C-nodes can maintain a database of network path to server associations. Alternatively, a specialized system can maintain the current set of associations and cause this list to be periodically communicated to each C-node.

In a different version of the invention, S-nodes are situated so all traffic intended for a particular server will pass through at least one S-node on its way to the server. For example, the S-node may be located in the same physical device as the server, or on a gateway computer on the server's local physical network, or at the server's ISP. In this case, a C-node need not identify the address of an S-node near the server. Rather, it should determine only the optimal sequence of I-nodes handling the C-node communication to the server. The S-node will have the capability to inspect all traffic to the server, and if the traffic is from an I-node (or directly from the C-node), then the S-node can retain such traffic for special handling but otherwise pass traffic on to the server unchanged.

Having chosen the whole path to the server, the C-node communicates the client's request to the first chosen I-node, using a specialized protocol or combination of such protocols; we hereafter call these internode protocols. In this embodiment, the communication from the C-node may also identify the chosen path, so that subsequent I-nodes may know where to forward the communication. These subsequent I-nodes use the same internode protocol or different internode protocols. The purpose of such protocols is to provide enhanced performance, which may mean reduced cost, reduced bandwidth consumption, reduced latency, increased security, and other such advantages, or any combination thereof.

In another embodiment of the invention, each node (C-node and I-node) prior to the S-node, is itself responsible for choosing the next "hop" (i.e. the next of the invention's node to which the message should be sent), rather than having the C-node choosing the entire path up front. In yet another embodiment, a separate device is responsible for determining the path and such device may be queried by each node when such node needs to determine the next path. It will be appreciated that the functionality and means for determining the path, be it on a hop-to-hop basis, on a whole-path basis, or in some combination thereof, can be distributed among the components of the invention in a variety of fashions. Such variations will be apparent to those skilled in the art.

The S-node receives the requests from the final I-node using the chosen internode protocol(s). Other software on the S-node is designed with the purpose of obtaining the requested content from the server, if it not already present at the S-node, and in either case communicating the response back to the C-node.

An S-node can also include an optional cache. If a web request can be satisfied, completely or partially, using content in this cache the S-node may use the cached content in forming its response to the I-node.

Otherwise, the S-node will communicate with the server and request the content. Such communication is carried out using standardized protocols that the server is designed to use, and today this will generally be some version of HTTP over TCP. Having then obtained the requested content, or other appropriate response to the original request, the S-node communicates this response back to the I-node again using some internode protocol or combination of such protocols designed for improved performance.

The communication between I-nodes follows a reverse path (with respect to the path traveled by the request) to the C-node. It will be appreciated that the invention may operate in one direction (client to server) or analogously (server to client), or both. In the latter case, there is no requirement that the particular nodes used and/or the order in which they are used be the same in each direction.

In embodiments of the invention that also carry traffic from server to client, the response will eventually reach some final node in the path the server which thus plays the role of a C-node. The C-node then forwards the response to the original requesting client. The C-node can be configured so that it waits to receive the full response before sending it, or alternatively can be configured to send information as it arrives so that the first part of the response is sent to the client even before the C-node has received the whole response. This response is sent using a standard protocol, which today will generally be a version of HTTP over TCP.

In some embodiments of the invention, the C-nodes, the I-nodes and S-nodes include software to communicate between each other for purposes other than directly responding to a request. In particular, the S-node may include software that attempts to predict in advance when a C-node might need a certain response, and in such cases the S-node can send the response to the I-node (or even to the C-node directly) without an explicit request from the corresponding I-node. The response is then available in the C-node's cache so that it can respond more quickly if it receives an appropriate request.

Many candidates exist for the internode protocols. Several techniques are already known that could speed up web communication, but which have not been widely deployed. The invention, however, is not limited to any particular such protocols, but contemplates continuing developments in this area. In the following is a list of 9 such protocols.

[INP 1] Connection Pooling. Before any HTTP communication can take place, a TCP connection is usually established. There is an overhead delay in establishing such a connection, which is at least one round-trip-time (RTT): the time taken for a packet to travel from the source to destination and back. A second cost involved in establishing a TCP connection is that the connection begins sending data in a special mode, usually called "slow start" mode, as a congestion avoidance measure. The significant point is that, while in slow start mode, the sender must wait more often for an "acknowledgement" message from the sender before it can send more data (i.e., additional packets). The delay caused by waiting for additional acknowledgements is usually proportional to RTT. As the name "slow start" indicates, performance while in this mode can be degraded. Only after a while, and in particular, after sufficient traffic has been sent, does the connection reach normal behavior.

In our invention, C-nodes, I-nodes and S-nodes can maintain one or more open TCP connections between pairs of them for far longer duration than the length of a typical client/server interaction. Each such connection can be reused, first on behalf of one client, then another, and so forth. In this way, there is considerable savings in the number of times new connections must be opened between nodes and thus in the overhead of connection establishment. The technique of maintaining one or more open connections for a longer period of time, and multiplexing several shorter communication sessions onto a single long-lived connection, is called connection pooling and has been applied in other contexts.

Even when connection pooling is used as part of an internode protocol, the clients that communicate with the C-nodes may still need to open connections to the C-nodes on a frequent basis. However, since one C-node can deliver content to the client on behalf of many servers, it may also be possible for a client to keep its connections to the C-node open for longer than it could keep an open connection to any single server.

Likewise, the servers that communicate with the S-nodes may still need to open connections to the S-nodes on a frequent basis. However, since one S-node can manage requests to the server on behalf of many different clients, it may also be possible to for a server to keep its connections to the C-node open for longer than it could keep an open connection to any client.

Even if there are frequent connection establishments between C-node and client, or between S-node and server, it is an important property of the invention that these network distances are likely to be short in either case. As noted above, the overhead costs of TCP connection establishment depend on RTT, and hence on network distance. Connection pooling as an internode protocol avoids excessive connection establishment over the comparatively long network distance between C-node and S-node, where the savings are greatest.

Connection pooling can be used with other connection-oriented protocols aside from TCP.

[INP 2] Modifications to TCP. Since TCP is widely believed to be an intrinsically inappropriate protocol for carrying HTTP traffic, there can be advantages to carrying HTTP either on an entirely different protocol or else on a modified version of TCP. Since the invention's C-nodes and S-nodes can be designed to use such proprietary or advanced protocols, any replacements for TCP or improvement to TCP can be used as internode protocols. We give some examples.

European Patent Application WO9940514 describes a protocol called Communication Enhancement Protocol (CEP) which is a flow control method that functions to improve communication over IP communication links (just as TCP also is carried over IP links), and which is capable of transporting HTTP. CEP uses particular flow control algorithms instead of TCP's flow control mechanisms, which can recover from errors more quickly and incur less overhead even for normal communication. Speed improvements of up to 2.5× are claimed. The cited document describes one possible way of improving TCP's flow control and error handling mechanisms, although as one skilled in the art will appreciate, it is merely representative of a wide variety of possible alternative protocols addressed at these specific problems.

T/TCP (Transaction TCP) is a variant of TCP in which enough information is kept on each host to avoid or reduce startup costs, specifically three-way handshakes and slow start.

The article "Satellite Communications in the Global Internet: Issues, Pitfalls, and Potential" by Y. Zhang, D. DeLucia, B. Ryu, and S. Dao (Proceedings INET'97 Conference, Kuala Lumpur, Malaysia, 1997) discusses many other commonly known ways of improving TCP, including the techniques known as Selective Acknowledgements, TCP with large windows (TCP-LW), congestion prediction (TCP Vegas), and TCP Spoofing.

[INP 3] HTTP header compression. The HTTP protocols include a header as part of every message, both requests and responses, in addition to any included content. This header is in readable, textual, form and typically is several hundred bytes long. Many aspects of the header are very predictable, or excessively verbose, and could be conveyed in a more concise compressed form. For example, a header often includes a field describing the length of the content, for instance including the line of text "Content-Length: 12345" if the content is 12345 bytes long. This could be compressed by including a short code known to signify the word "Content-Length" and by encoding the number 12345 in a 2 byte binary representation rather than as 5 separate characters. For another example, the header often announces various characteristics of the client or server, such as the version of software it is running. This information does not need to be sent repeatedly. For example, if a C-node remembers the software version of each server, then the S-node need not include this item of information in every response it conveys to the C-node. Instead, the C-node would be capable of reconstructing the necessary line of HTTP header just before conveying the response to the sender in HTTP. As those skilled in the art will appreciate, these are merely examples of the many ways in which HTTP headers might be compressed. In addition to compression techniques specific to HTTP headers, standard text compression techniques can also be used.

The internode protocols may be using a modified version of HTTP in which all header information is compressed. Because fewer bytes are sent, performance will improve proportionately.

[INP 4] HTTP content compression. The response messages sent from the S-node to the C-node, intended to be conveyed to the client, usually contain web content. Most such content can be compressed using standard algorithms appropriate to the content; for instance text is often compressed using a standard algorithm called "gzip". Direct communication between a client and server sometimes uses compression today. However, compression can only occur if the client and server can negotiate a compression method that both have software for, and if both client and server can afford the computational cost of performing decompression (or, respectively, compression).

Because C-nodes and S-nodes can be configured to run advanced compression software, and all can be configured with the same compression abilities, and may used hardware acceleration or other techniques to improve the speed of compression and decompression, they may use compression universally for all compressible web content. Our invention can use advanced web content compression techniques as an internode protocol, thus reducing the volume of traffic that is communicated between nodes and enhancing performance proportionately.

[INP 5] Predictive prefetching. A C-node may attempt to predict future requests that are likely to be made by a client, on the basis of requests it has already received. The most important instance of this occurs when a client receives an HTML page with references to embedded objects, which may be small images, small pieces of code in a scripting language such as a JavaScript, HTML style sheets, content to be placed into HTML frames, and others. Almost all client software in use today is configured by default to request these embedded images immediately, without waiting for user feedback of approval. A C-node that delivers the original page can predict, with extremely high confidence, that it will shortly receive requests from the same client for these embedded objects.

The invention can employ a software component that, based on the request received from a client or a response returned to a client, predicts other web objects that the client is likely to request in the near future. For such objects that are stored in the C-node's cache, the C-node may optionally send a request to the corresponding I-node, S-node or directly to the objects' server to verify whether the cached object is still fresh. For some or all of such objects that are not stored in the C-node's cache, the C-node may send a request to the corresponding S-node to retrieve the objects. When the C-node receives the objects from the S-node, it may forward them to the client if a request has been received from the client in the meantime, or may store the objects in a cache in anticipation of such a request.

[INP 6] Predictive content pushing. An S-node may also attempt to predict future requests that are likely to be made by a client, on the basis of requests it has seen. The invention may use an internode protocol whereby the S-node, after obtaining responses to these predicted future requests, sends the predicted request together with their responses to the C-node (either directly, or following the optimal sequence of I-nodes) from which the original requests came. It is an important distinction from standard web protocols, such as HTTP, that in this internode protocol such responses are "pushed" from the S-node to the C-node even if the C-node has not made any explicit request for them.

The C-node understands the protocol of pushed web content and will receive the requests and responses sent by the S-node, and store these in its cache. If a client later makes one of the predicted requests then the C-node can respond promptly using the cached response.

This internode protocol is useful even if the C-node (or intermediate I-nodes) has a very small cache, capable of storing requests and responses for a few seconds or less. Thus it may require fewer resources, such as disk space or memory, than a traditional cache or Content Distribution node. Traditional caches and Content Distribution nodes get their content directly from web servers and communicate with a standard protocol such as HTTP, which cannot push content unless there is an explicit request for it. The use of a push internode protocol discussed here, in which a C-node's (or I-node) cache is populated when a S-node predicts requests likely to be made in the near future and pushes these response to the C-node, is made possible using the invention's architecture comprising both C-nodes and S-nodes.

A variant of this protocol may be used for cache maintenance. When an S-node sees that the server has updated some content, for instance by noticing that an element in its own cache has become stale, it can push notification of this change (and the new version of the content) to some or all C-nodes (I-nodes) that have the stale version.

[INP 7] Pipelining. A requester of web content can send multiple requests to a server, one after another, on a single TCP connection without waiting for the response to one request coming back before sending the next request. The server should return responses in the same order as the requests are received, so that the client can match responses against requests. This process is called pipelining, and is known to be able provide significant performance gains. The PhD Dissertation "Addressing the Challenges of Web Data Transport" by V. N. Padmanabhan (Computer Science Division, University of California at Berkeley, USA; Also published as Technical Report UCB/CSD-98-1016 September 1998) documents this technique and the results of experiments confirming its promise. Very few web clients in use today support pipelining; many but not all web servers do so.

The invention can use an internode protocol that pipelines requests and responses between the network nodes, even if the client, the server, or neither can use pipelining themselves. For example, even non-pipelining browsers usually open multiple connections to a given destination (such as a server or a C-node) and send several requests simultaneously. The C-node can receive these simultaneous requests and pipeline them to an I-node along a single connection. Similarly, if a server cannot pipeline then an S-node can instead take a pipelined series of requests and multiplex them onto multiple TCP connections to the server, retrieve the responses in parallel from these multiple connections, and send them back to an I-node in pipelined fashion.

[INP 8] Delta-encoding and template instantiation. Many web pages, especially those that are dynamically generated, are largely similar to each other aside from minor changes. A common case is when the web page can be viewed as an unchanging template, customized in some way with user-specific data (for instance, a person's name). One internode protocol is delta-encoding, in which a node, say, the C-node has in its cache a first web object similar but not identical to the second web object which is the one requested. The S-node can retrieve the second object from its cache or from the server, and extract some representation of the difference (delta) between the two objects with such representation being more concise than either. The S-node communicates the delta representation to the C node, which combines it with the first object it has cached to reconstruct the requested second object, which is then communicated to the client. In this way, fewer bytes are communicated between the S-node and the C-node.

A variant of this internode protocol is template instantiation, in which the S-node analyses a web object and separates the object into two parts, called the template and the customization data, such that the original object can be constructed from the two parts. (Alternatively, the server itself may have defined this separation.) The S-node communicates both template and customization data to the C-node, and instructs the C-node to keep the former in cache. When the S-node needs to send another object to the C-node with the same template but with different customization data, it may instead send a short code designating the template, together with the customization data. The C-node constructs the original page and communicates this page to the client.

The same procedures can be implemented only for particular pairs of communicating I-nodes, C-nodes and I-nodes, S-nodes and I-nodes, etc.

[INP 9] Delta-encoding using node caching. This internode protocol requires an I-node or an S-node to have a cache storing certain requests and responses it has delivered. The distinctive features operate when the S-node (or the I-node) receives a request for a second object that may be identical to a first object already in the S-node's cache, or may be very similar but not identical to a cached first object, but such it is not known for certain what the differences between the first object and second object are, if any. For example, one such case is if the requested object is identified using the same URL as the object stored in the cache, but the corresponding object may have been updated in the server and so the cached object is at risk of being stale. Another common case is when the URL is different from that of the cached object, but the differences only occur after the presence of a question mark "?", since by convention it is likely that the two objects are the output of the same cgi-bin program used with different parameters and may thus be substantially similar.

The S-node (I-node) communicates the first object from the cache to the requesting node as soon as it receives the request together with an indication that the requesting node should not deliver the first object to the previous node (or the client) but rather keep it in temporary storage. The S-node (I-node) simultaneously requests the desired second object from the server (next I-node or S-node). When the S-node (I-node) receives the second object, it compares it with the first object and determines whether they are different. If they are not different, the S-node (I-node) sends a short message to the requesting node informing it to send the object held in temporary storage to the previous node (client). If they are different, the S-node (I-node) may send the second object in its entirety, so that when the requesting node receives it, the node sends the second object to the next node (client) and discards the first object held in temporary storage. Alternatively, if they are different, the S-node (I-node) may send to the requesting node some representation of the difference between these two objects, so that the requesting node can combine this representation with the first object held in temporary storage, to recover the second object and then send it further.

This internode protocol does not reduce the net volume of the traffic communicated over the Internet, and does not involve caching a similar object to the one requested near the client in anticipation of a request. However, this protocol can reduce the latency until the client receives the requested object, because the first object is communicated back to the C-node even while the server is still working to evaluate the request and while the server is in the process of sending the response to the S-node. If it turns out that the first object is identical to the second object or has only a small difference to it, the S-node needs send only a short, and thus fast, communication to the C-node before the C-node can send a response to the client.

[INP 10] Specialized Routing. Today, Internet messages and packets travel from a source device (such as a web client) to a destination (such as a web server) using a path determined by low-level network devices called routers. Routers cannot quickly adapt to changing network conditions in the wide-area Internet, and no single router has a global view of Internet topology or current conditions. Thus, traffic is often sent along an suboptimal path, which may include, among other defects, congested sublinks and congested intermediate routers where service has been degraded due the volume of traffic or due to technical malfunctions. The invention can be used in conjunction with mapping and monitoring means that determine such points of congestion and technical difficulty.

The choice of nodes, including the C-node, the S-node, and the intermediate path of I-nodes, may be made so that the communication path so composed out of the individual sub-links between nodes avoids such trouble spots. In such cases, a performance advantage may be seen even if the invention uses conventional or standard protocols to communicate between nodes. That is, the invention contemplates that the high-performance delivery enabled by the device may be partly or primarily a consequence of the route which is forced or influenced to be taken by the choice of nodes, including the choice of C-node, the choice of I-node(s) (and the order of these I-nodes), and the choice of S-node.

A preferred embodiment of the invention uses DNS-based redirection [method R3] in conjunction with network mapping [employing methods M1–M6 in combination]. The network mapping device is software running on a dedicated or the same machine as the DNS server. The DNS server, when queried, will as part of the query learn either the IP address of the client or the IP address of another DNS server that is likely to be close to the client. The mapping device then uses this provided address and its maps to determine a C-node likely to be close to the provided address, as discussed previously. Simultaneously, the mapping device will determine the optimal sequence of I-nodes and the S-node corresponding to the requested server and the chosen C-node, and communicate this information to all nodes involved in this path. Each C-node is given multiple IP addresses and the DNS system returns a different IP address according not just to which C-node is chosen but also according to the name of the server (or the first I-node). The C-node then uses IP address sorting [S1] to discover the address of the I-node.

The internode protocols used will replace TCP with a faster protocol such as T/TCP modified with selective acknowledgements. HTTP Header compression, HTTP content compression, Predictive Content Pushing, and Delta-encoding [INP3, INP4, INP6, INP8, INP9] will be used simultaneously.

It will be appreciated that, although the invention has been described in terms of a request being sent from client to server and a response being sent back, the invention may be adapted to enhance performance for either request or response alone. Similarly, there is no requirement that the internode protocols used to communicate from S-node to C-node be the same as those used in the reverse direction.

It will further be appreciated that, although various details are given above, these are simply illustrative of possible embodiments of the invention.

What is claimed is:

1. A method for communicating an Internet message between a source and a destination over the Internet, comprising:
    selecting a node of a first type, by determining a measure of communications performance for a sub-link between the source and a candidate node of a first type, to optimize the measure of communications performance for the sub-link between the source and the candidate node of a first type;
    selecting a node of a second type, by determining a measure of communications performance for a sub-link between the destination and a candidate node of a second type, to optimize the measure of communications performance for the sub-link between the destination and the candidate node of a second type;
    communicating an Internet message from the source to the selected node of a first type using a first communication protocol;
    communicating the Internet message from the selected node of a first type to the selected node of a second type using a second communication protocol and via at least one node of a third type, wherein the second communication protocol is designed to be of higher performance than a prevailing standard communication protocol used by the source; and
    communicating the Internet message from the selected node of a second type to the destination using a third communication protocol.

2. The method of claim 1 wherein the step of selecting a node of a second type comprises:
    determining a measure of communications performance for a sub-link between a candidate node of a first type and a candidate node of a second type; and
    selecting a node of a second type from among a plurality of candidate nodes of a second type to optimize the measure of communications performance for the sub-link between the candidate node of a first type and the candidate node of a second type.

3. The method of claim 1 wherein
the step of selecting a node of a first type comprises:
    determining a first measure of communications performance for a sub-link between the source and a candidate node of a first type; and
    selecting a node of a first type from among a plurality of candidate nodes of a first type to optimize the first measure of communications performance for the sub-link between the source and the candidate node of a first type; and
the step of selecting a node of a second type comprises:
    determining a second measure of communications performance for a sub-link between the selected node of a first type and a candidate node of a second type, and a third measure of communications performance for a sub-link between the candidate node of a second type and the destination; and
    selecting a node of a second type from among a plurality of candidate nodes of a second type to optimize a combination of the second and third measures of communications performance.

4. The method of claim 1 further comprising the steps of:
    communicating a second Internet message from the destination to the selected node of a second type using a fourth communication protocol;
    communicating the second Internet message from the selected node of a second type to the selected node of a first type using a fifth communication protocol; and
    communicating the second Internet message from the selected node of a first type to the source using a sixth communication protocol.

5. The method of claim 1 wherein the step of communicating an Internet message from the source to the selected node of a first type comprises redirecting the Internet message from the source to the selected node of a first type.

6. A method for communicating an Internet message between a source and a destination over the Internet, comprising:
    selecting a node of a first type, by determining a measure of communications performance for a sub-link between the source and a candidate node of a first type, to optimize the measure of communications performance for the sub-link between the source and the candidate node of a first type;
    communicating an Internet message from the source to the selected node of a first type using a first communication protocol;
    communicating the Internet message from the selected node of a first type to a node of a second type using a second communication protocol and via at least one node of a third type, wherein the second communication protocol is designed to be of higher performance than a prevailing standard communication protocol used by the source; and communicating the Internet message from the node of a second type to the destination using a third communication protocol.

7. The method of claim 6 wherein the step of communicating an Internet message from the source to the selected node of a first type comprises redirecting the Internet message from the source to the selected node of a first type.

8. A system for communicating an Internet message from a source to a destination over the Internet, comprising:
   a plurality of nodes including one or more nodes of a first type, one or more nodes of a second type and one or more nodes of a third type;
   a first selector to select a node of a first type from the one or more nodes of a first type and communicate the selection to the source, wherein the first selector selects the node of a first type to increase the performance of communicating the Internet message between the source and the destination; and
   a second selector to selects a node of a second type from the one or more nodes of a second type and communicate the selection to a selected node of a first type, wherein the second selector selects the node of a first type to increase the performance of communicating the Internet message between the source and the destination;
   wherein each node of a first type comprises:
      a receiver to receive the Internet message from the source using a first communication protocol;
      a transmitter to communicate the Internet message to a selected node of a second type using a second communication protocol and via at least one node of a third type, wherein the second communication protocol is designed to be of higher performance than a prevailing standard communication protocol used by the source;
   each node of a second type comprises:
      a receiver to receive the Internet message from a selected node of a first type using the second communication protocol and via at least one node of a third type; and
      a transmitter to communicate the Internet message to the destination using a third communication protocol; and
   each node of a third type comprises:
      a receiver to receive the Internet message from a node using the second communication protocol; and
      a transmitter to communicate the Internet message to another node using the second communication protocol.

9. The system of claim 8 wherein:
   the first selector selects a node of a first type that optimizes a first measure of communications performance for a sub-link between the source and each of a plurality of candidate nodes of a first type.

10. The system of claim 8 wherein:
    the second selector selects a node of a second type that optimizes a measure of communications performance for a sub-link between a selected node of a second type and the destination.

11. The system of claim 8 wherein:
    each node of a second type further comprises a receiver to receive a second Internet message from the destination using a fourth communication protocol, and a transmitter to communicate the second Internet message to a node of a first type using a fifth communication protocol; and
    each node of a first type further comprises a receiver to receive the second Internet message from a node of a second type using the fifth communication protocol, and a transmitter to communicate the second Internet message to the source using a sixth communication protocol.

12. A system for communicating an Internet message from a source to a destination over the Internet, comprising:
    a plurality of nodes including one or more nodes of a first type, one or more nodes of a second type and one or more nodes of a third type; and
    a selector to select a node of a first type from the one or more nodes of a first type and communicate the selection to the source, wherein the selector selects the node of a first type to increase the performance of communicating the Internet message between the source and the destination;
    wherein each node of a first type comprises:
       a receiver to receive the Internet message from the source using a first communication protocol;
       a transmitter to communicate the Internet message to a node of a second type using a second communication protocol and via at least one node of a third type, wherein the second communication protocol is designed to be of higher performance than a prevailing standard communication protocol used by the source; and
    each node of a second type comprises:
       a receiver to receive the Internet message from a selected node of a first type using the second communication protocol and via at least one node of a third type; and
       a transmitter to communicate the Internet message to the destination using a third communication protocol; and
    each node of a third type comprises:
       a receiver to receive the Internet message from a node using the second communication protocol; and
       a transmitter to communicate the Internet message to another node using the second communication protocol.

13. The system of claim 12 wherein:
    the selector selects a node of a first type that optimizes a first measure of communications performance for a sub-link between the source and each of a plurality of candidate nodes of a first type.

14. A system for communicating an Internet message from a source to a destination over the Internet, comprising:
    a plurality of nodes including one or more nodes of a first type, one or more nodes of a second type, and one or more nodes of a third type; and
    a selector to select a node of a first type from the one or more nodes of a first type and communicate the selection to the source, and to select a node of a second type from the one or more nodes of a second type and provide the selection to a selected node of a first type;
    wherein each node of a first type comprises:
       a receiver to receive the Internet message from the source using a first communication protocol; and
       a transmitter to communicate the Internet message to a selected node of a second type using a second communication protocol and via at least one node of a third type, wherein the second communication protocol is designed to be of higher performance than a prevailing standard communication protocol used by the source; and each node of a second type comprises:
  a receiver to receive the Internet message from a selected node of a first type using the second communication protocol and via at least one node of a third type; and
  a transmitter to communicate the Internet message to the destination using a third communication protocol; and each node of a third type comprises:
  a receiver to receive the Internet message from a node using the second communication protocol; and
  a transmitter to communicate the Internet message to another node using the second communication protocol.

15. The system of claim 14 wherein the selector selects a node of a first type and a node of a second type that optimize a measure of communications performance for a sub-link between the source and the selected node of a first type, a sub-link between the selected node of a first type and the selected node of a second type, and a sub-link between the selected node of a second type and the destination.

16. The system of claim 14 wherein the selector selects a node of a first type and a node of a second type that optimize a measure of communications performance for at least a sub-link in a link between the source and the destination.

17. The system of claim 14 wherein:
each node of a second type further comprises a receiver to receive a second Internet message from the destination using a fourth communication protocol, and a transmitter to communicate the second Internet message to a node of a first type using a fifth communication protocol; and
each node of a first type further comprises a receiver to receive the second Internet message from a node of a second type using the fifth communication protocol, and a transmitter to communicate the second Internet message to the source using a sixth communication protocol.

18. A system for communicating an Internet message from a source to a destination over the Internet, comprising:
  a plurality of nodes including one or more nodes of a first type, one or more nodes of a second type and one or more nodes of a third type; and
  a selector to select a node of a second type from the one or more nodes of a second type and provide the selection to a node of a first type;
wherein each node of a first type comprises:
  an interceptor to intercept the Internet message from the source using a first communication protocol;
  a transmitter to communicate the Internet message to a selected node of a second type using a second communication protocol and via at least one node of the third type, wherein the second communication protocol is designed to be of higher performance than a prevailing standard protocol used by the source;
each node of a second type comprises:
  a receiver to receive the Internet message from a selected node of a first type using the second communication protocol and via at least one node of a third type; and
  a transmitter to communicate the Internet message to the destination using a third communication protocol; and each node of a third type comprises:
  a receiver to receive the Internet message from a node using the second communication protocol; and
  a transmitter to communicate the Internet message to another node using the second communication protocols
wherein the selector selects a node of a second type to maximize the performance gain of using the second communication protocol.

19. A system for communicating an Internet message from a source to a destination over the Internet, comprising:
  a plurality of nodes including one or more nodes of a first type, one or more nodes of a second type and one or more nodes of a third type; and
  a first selector to select a node of a first type from the one or more nodes of a first type and communicate the selection to a redirector;
  a second selector to select a node of a second type from the one or more nodes of a second type and provide the selection to a selected node of a first type;
  the redirector to redirect the Internet message from the source to a selected node of a first type;
wherein each node of a first type comprises:
  a receiver to receive the Internet message from the redirector using a first communication protocol;
  a transmitter to communicate the Internet message to a selected node of a second type using a second communication protocol and via at least one node of a third type, wherein the second communication protocol is designed to be of higher performance than a prevailing standard communication protocol used by the source;
each node of a second type comprises:
  a receiver to receive the Internet message from a selected node of a first type using the second communication protocol and via at least one node of a third type;
  a transmitter to communicate the Internet message to the destination using a third communication protocol; and
each node of a third type comprises:
  a receiver to receive the Internet message from a node using the second communication protocol; and
  a transmitter to communicate the Internet message to another node using the second communication protocol;
wherein the first selector selects a node of a first type and the second selector selects a node of a second type to maximize the performance gain of using the second communication protocol.

20. A system for communicating an Internet message from a source to a destination over the Internet, comprising:
  a plurality of nodes including one or more nodes of a first type, one or more nodes of a second type, and one or more nodes of a third type; and
  a selector to select a node of a first type from the one or more nodes of a first type and communicate the selection to a redirector;
  the redirector to redirect the Internet message from the source to a selected node of a first type;
wherein each node of a first type comprises:
  a receiver to receive the Internet message from the redirector using a first communication protocol;
  a transmitter to communicate the Internet message to a node of a second type using a second communication protocol and via at least one node of the third type, wherein the second communication protocol is designed to be of higher performance than a prevailing standard communication protocol used by the source; and each node of a second type comprises:
- a receiver to receive the Internet message from a selected node of a first type using the second communication protocol and via at least one node of a third type; and
- a transmitter to communicate the Internet message to the destination using a third communication protocol; and each node of a third type comprises:
- a receiver to receive the Internet message from a node using the second communication protocol; and
- a transmitter to communicate the Internet message to another node using the second communication protocol;

wherein the selector selects a node of a first type to maximize the performance gain of using the second communication protocol.

21. A method for communicating an Internet message between a source and a destination, comprising:
- selecting a node of a first type from one or more nodes of a first type to increase the performance of communicating the Internet message between the source and the destination, wherein the selected node of a first type is close to the source;
- selecting a node of a second type from one or more nodes of a second type to increase the performance of communicating the Internet message between the source and the destination, wherein the selected node of a second type is close to the destination;
- selecting a node of a third type from one or more nodes of a third type to increase the performance of communicating the Internet message between the source and the destination;
- communicating an Internet message from the source to the selected node of a first type using a first communication protocol;
- communicating the Internet message from the selected node of a first type to the selected node of a third type using a second communication protocol, the second communication protocol being a high performance protocol;
- communicating the Internet message from a node of a third type to the selected node of a second type using the second communication protocol; and
- communicating the Internet message from the selected node of a second type to the destination using a third communication protocol.

22. A system for communicating Internet messages between a source and a destination, comprising:
- a plurality of nodes of a first type;
- a plurality of nodes of a second type;
- a plurality of nodes of a third type; and
- a selector to select a node of a first type;

wherein each of the plurality of nodes of a first type comprises:
- a cache for storing content;
- a receiver to receive an Internet message from the source using a first communication protocol; and
- a transmitter to send an Internet message to a node of a second type or a node of a third type using a second communication protocol, the second communication protocol being a high performance communication protocol;

wherein each of the plurality of nodes of a third type comprises:
- a receiver to receive an Internet message from a node of a first type or a node of a third type using the second communication protocol; and
- a transmitter to send an Internet message to a node of a third type or a node of a second type using the second communication protocol;

wherein each of the plurality of nodes of a second type comprises:
- a receiver to receive an Internet message from a node of a first type or a node of a third type using the second communication protocol; and
- a transmitter to send an Internet message to the destination using a third communication protocol;

wherein the selector selects a node of a first type to maximize the performance gain of using the second communication protocol.

23. The system of claim 22, wherein each of the plurality of nodes of a second type further comprises a cache for storing and serving content.

24. The system of claim 22, wherein each of the plurality of nodes of a third type further comprises a cache for storing and serving content.

* * * * *